April 2, 1929.  E. O. SCHJOLIN  1,707,742
AIR BRAKE SYSTEM FOR VEHICLES
Filed Nov. 24, 1924   7 Sheets-Sheet 2
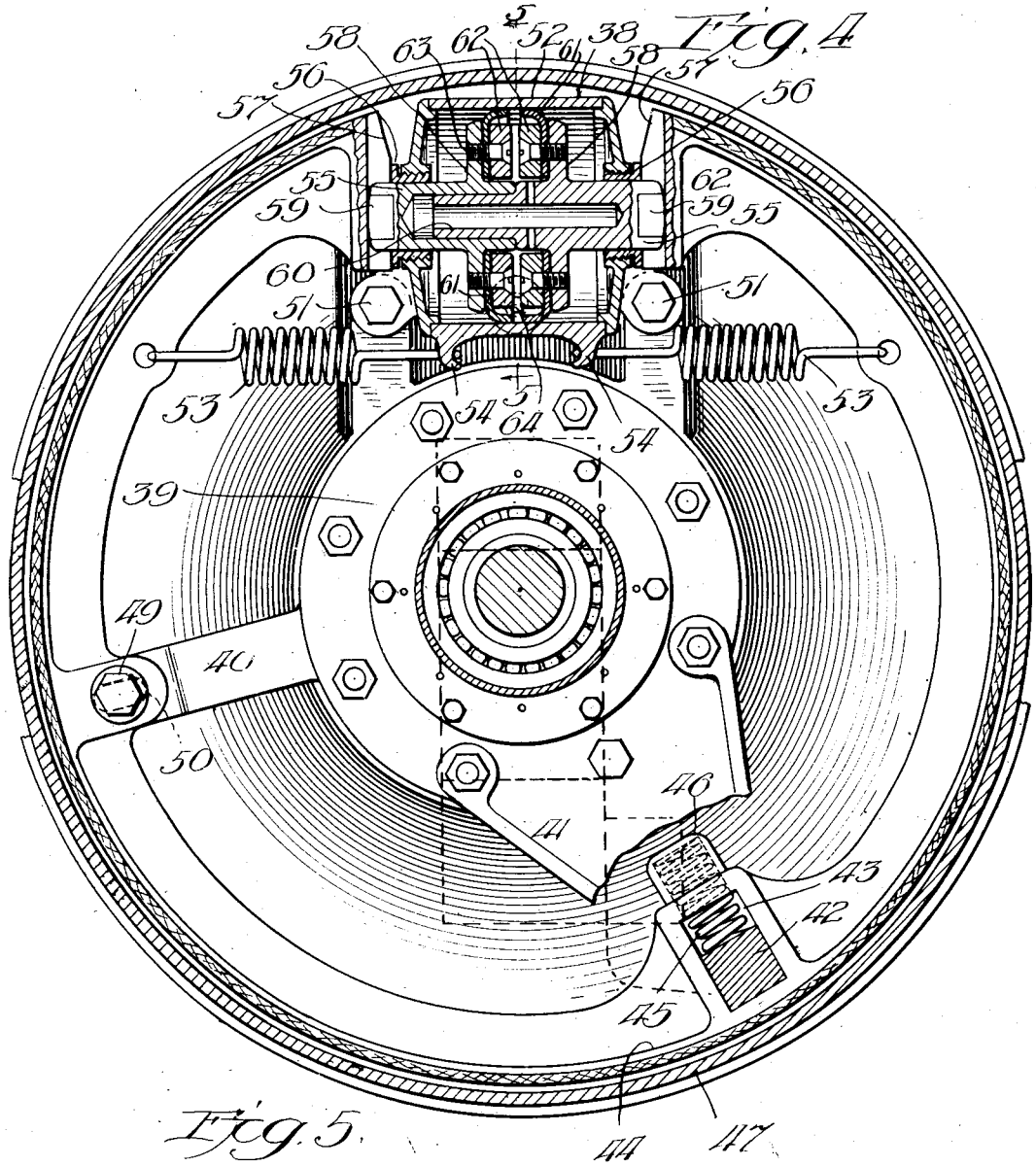
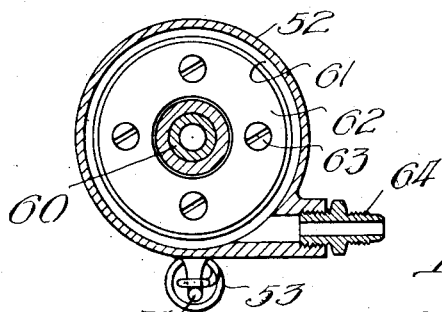
Inventor
Erik Otie Schjolin
by Rector, Hibben, Davis & Macauley
Attys

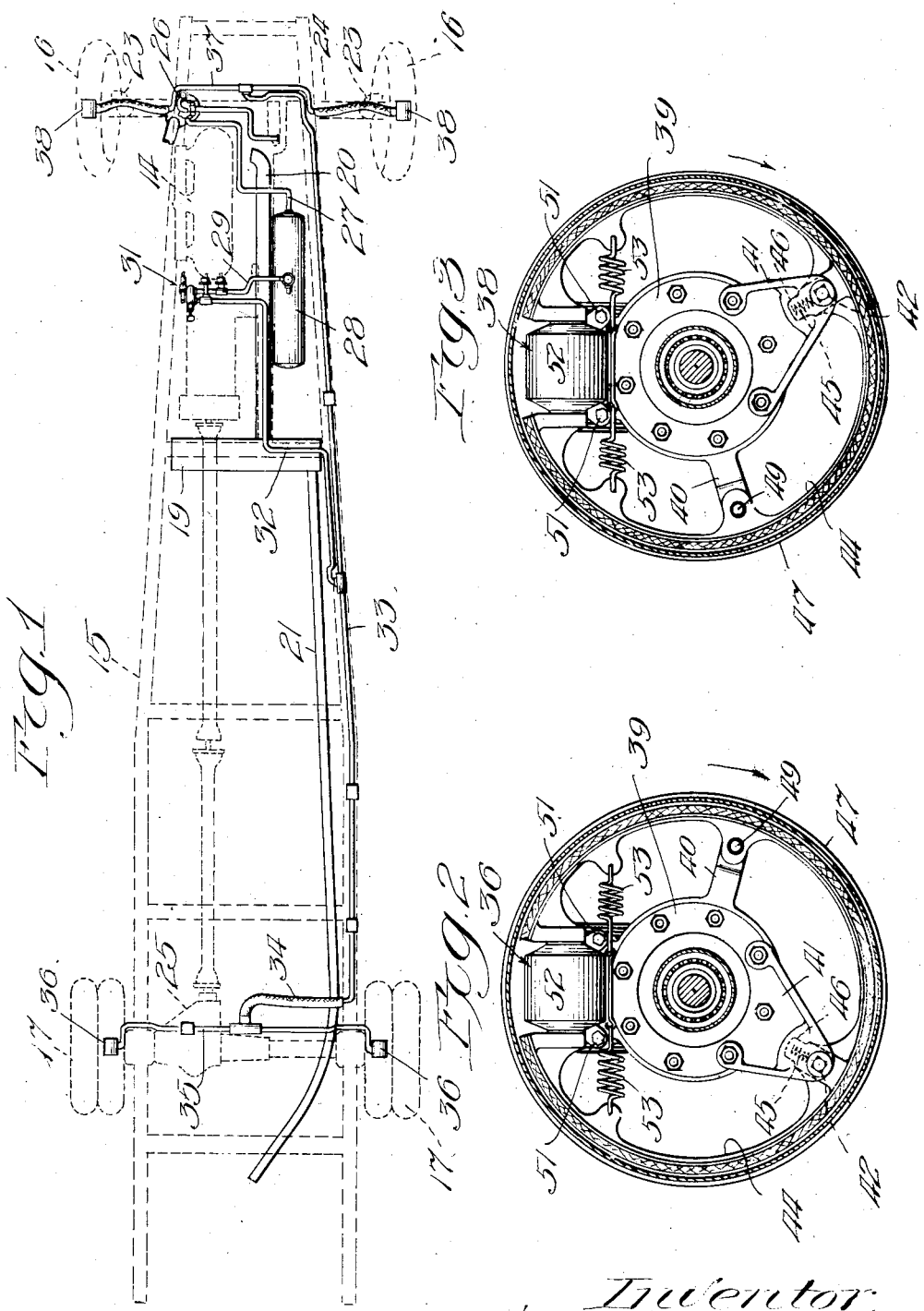

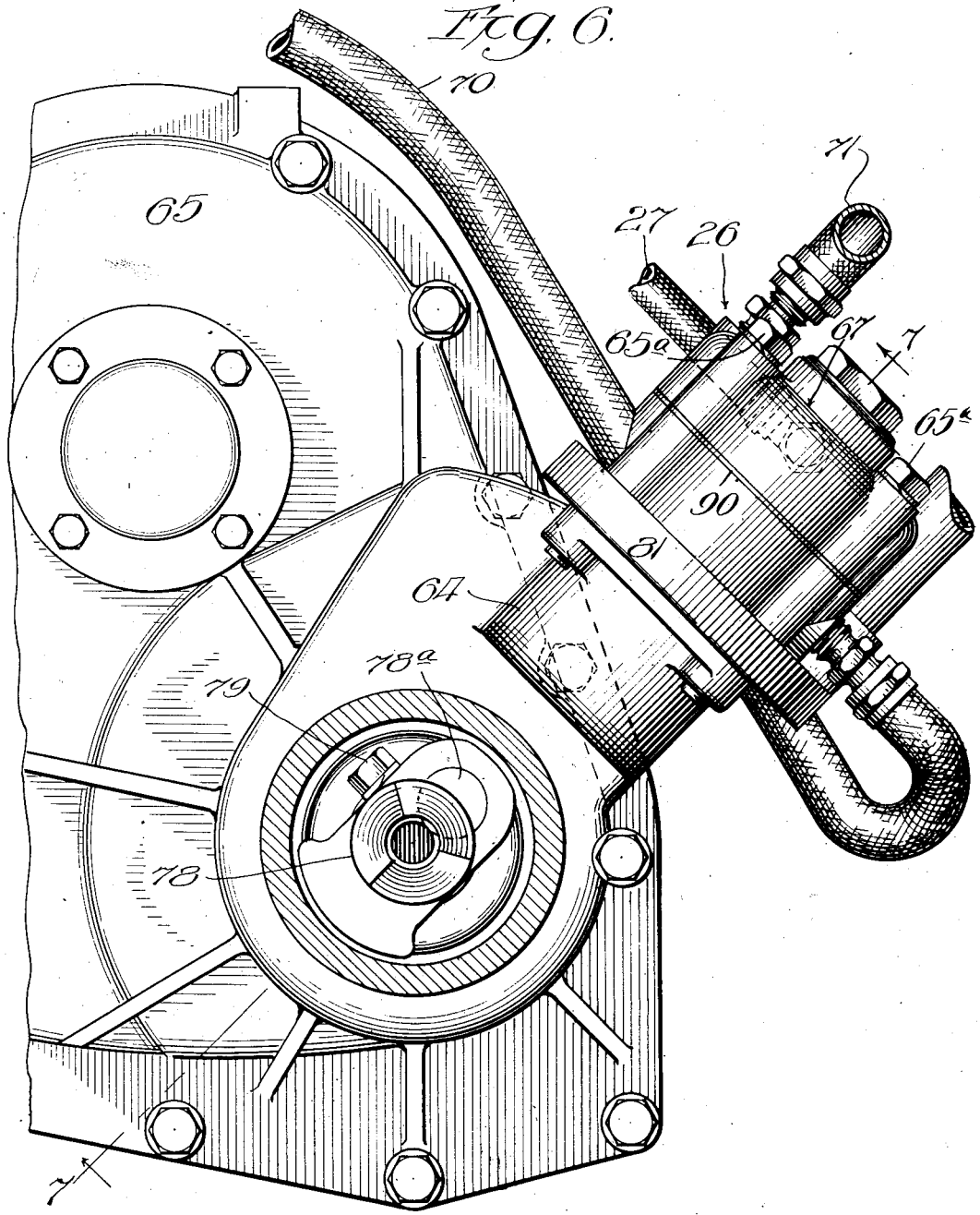

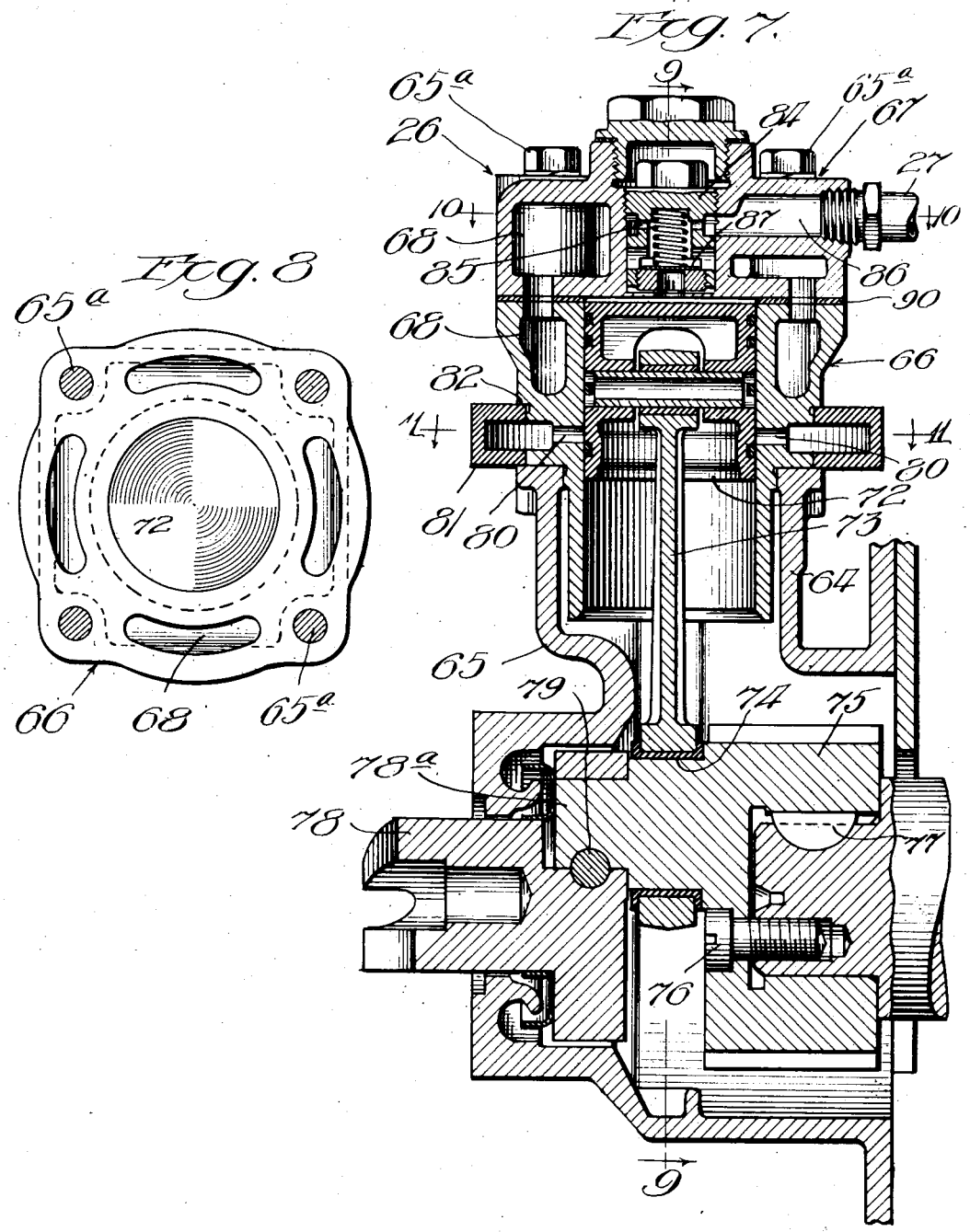

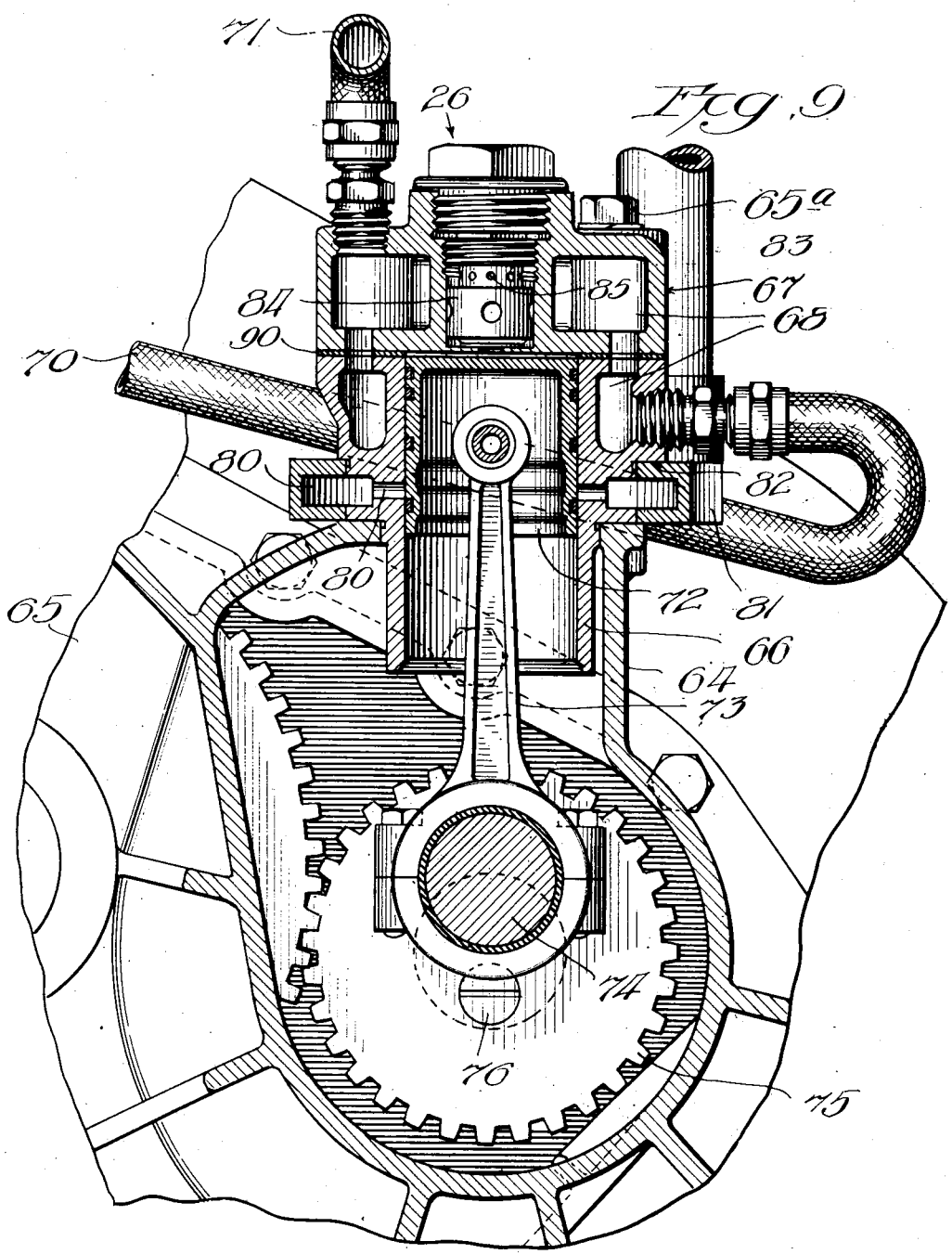

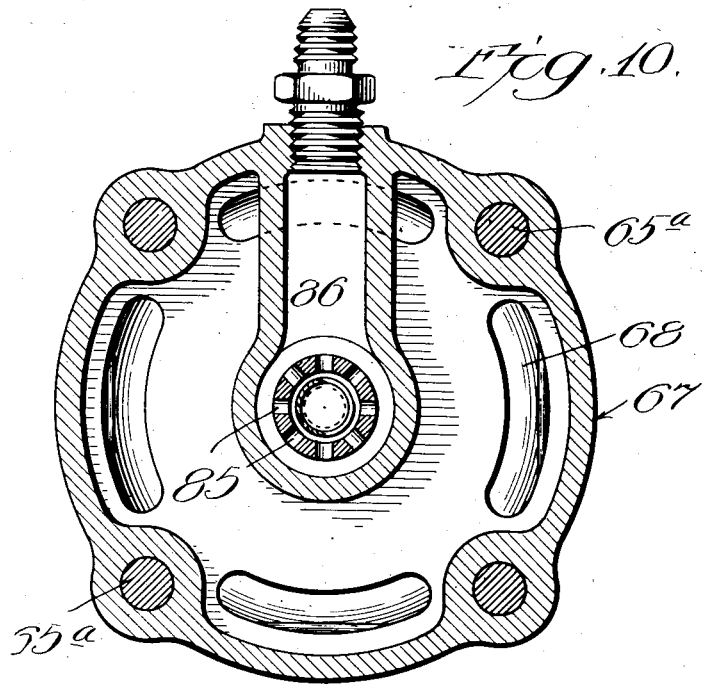
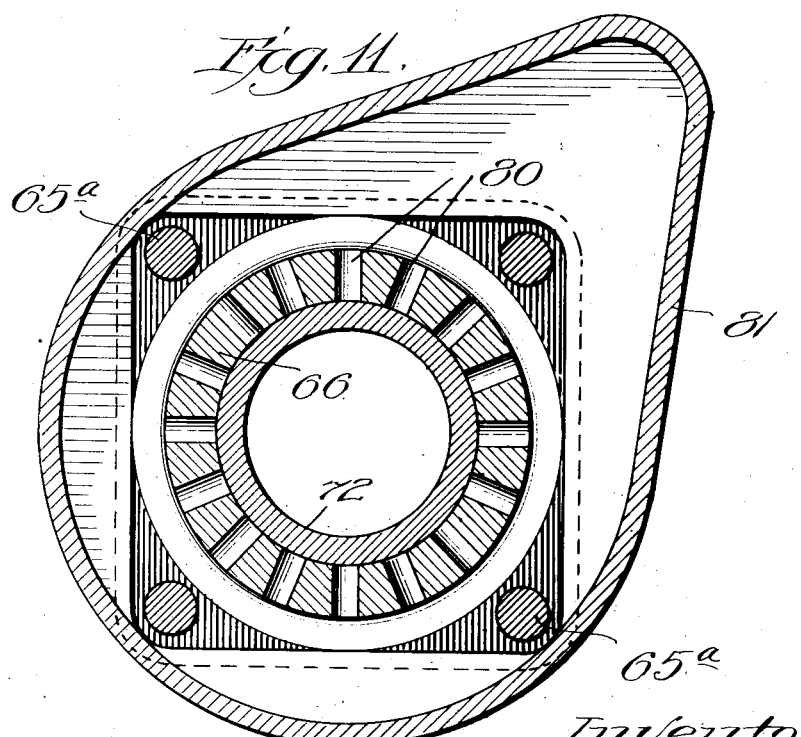

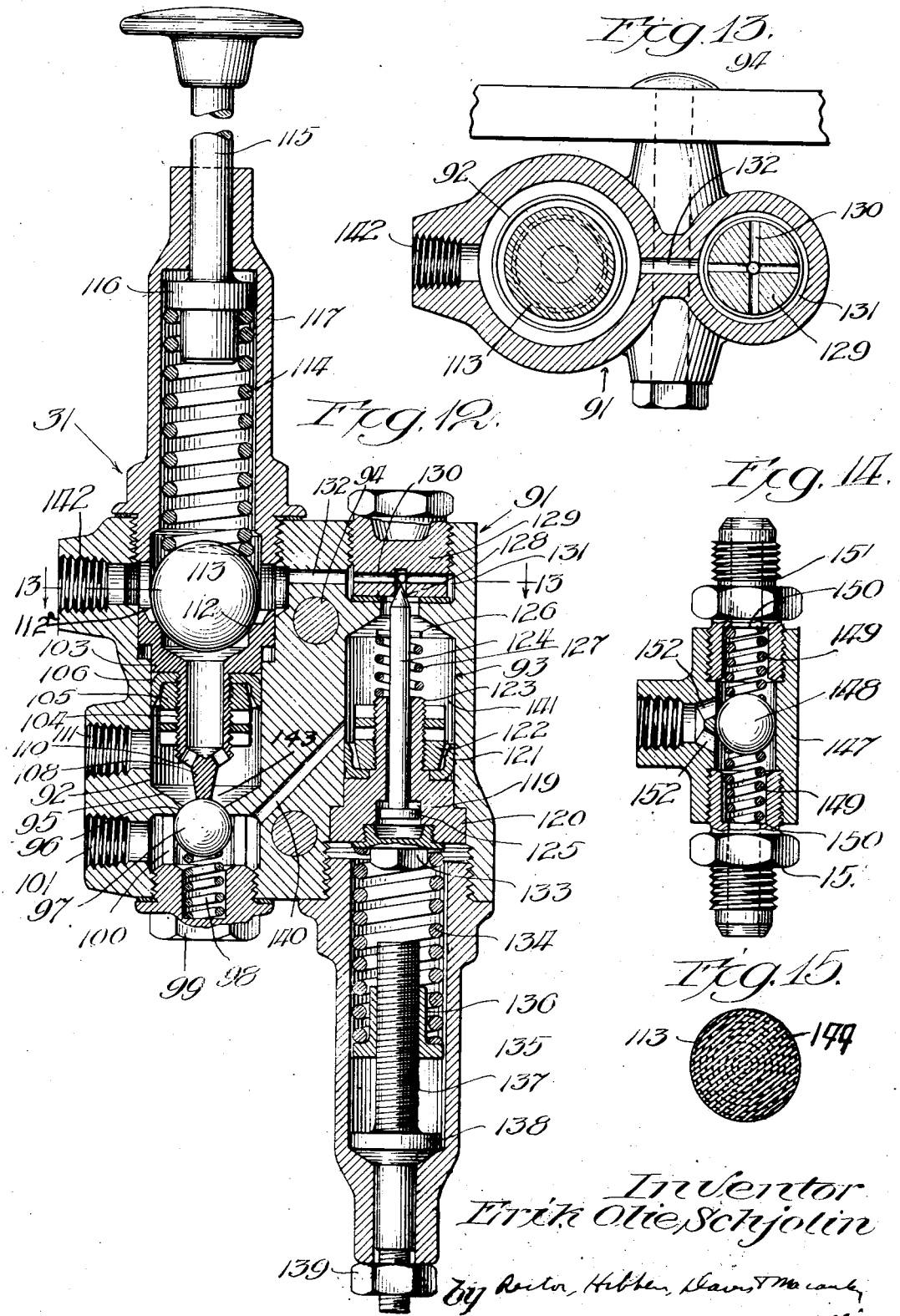

Patented Apr. 2, 1929.

1,707,742

UNITED STATES PATENT OFFICE.

ERIK OLIE SCHJOLIN, OF CHICAGO, ILLINOIS, ASSIGNOR TO YELLOW COACH MANUFACTURING COMPANY, OF CHICAGO, ILLINOIS, A CORPORATION OF ILLINOIS.

AIR-BRAKE SYSTEM FOR VEHICLES.

Application filed November 24, 1924. Serial No. 751,755.

This invention relates to improvements in air brake systems for vehicles and more particularly for motor vehicles, and the principal object of the invention is to provide a pneumatically operated brake system which, among other advantages, is simple in construction and arrangement, effective in operation, and easily controlled.

One of the main objects of my invention is to arrange the brakes for the front and rear wheels so that the braking effort of the rear brakes is greater than that of the front brakes, while at the same time parts of the front and rear brake mechanisms are alike in construction. To this end the points of mounting the brake bands for the front and rear wheels are arranged off-center and so positioned that the braking effort exerted on the rear wheels is greater than that exerted on the front wheels, though the air pressure in the brake cylinders for operating the brakes for the front wheels is the same as that in the brake cylinders for the rear brakes.

Another object of my invention is to provide an improved control valve which is simple in design, readily adjustable, sensitive in operation, subject to minimum wear and extremely efficient in controlling the system.

A further object of my invention is to mount the air pump, for supplying air to the system, in a novel position and in a novel manner on a housing of the internal combustion engine for propelling the vehicle, and to design the pump so that it is simple in construction, efficient in operation, and will not become unduly heated.

Still another object of the invention is to provide improved balanced valves at appropriate points in the system so that in the event of leakage of air from part of the brake system, such as in case of breakage of a pipe thereof, the leaking portion of the pipe or system will be automatically closed and the effective operation of the remainder of the system will not be impaired or interfered with.

With the above and incidental objects in view, the invention consists in certain novel features of construction and combination of parts, the essential elements of which are recited in the appended claims and a preferred form of embodiment of which is described in detail hereinafter and illustrated in full in the accompanying drawings which form part of this specification.

Of said drawings, Fig. 1 is a top view of a chassis of an automobile with an air brake system, embodying my invention, applied thereto, the chassis and wheels being shown more or less diagrammatically in dotted lines for the sake of illustration; Figs. 2 and 3 are side elevations (looking inwardly) of the braking mechanisms for a rear and a front wheel respectively, with the brake drums shown in section; Fig. 4 is an enlarged view of Fig. 3 with some of the parts shown in section; Fig. 5 is a reduced transverse sectional view taken through one of the brake cylinders, as on the line 5—5 of Fig. 4; Fig. 6 is a front elevation of part of the internal combustion engine showing the air pump in position thereon; Fig. 7 is a sectional view taken through the air pump and the driving means therefor, the section being taken on the line 7—7 of Fig. 6; Fig. 8 is a top plan view of the cylinder of the pump; Fig. 9 is another sectional view through the pump and the supporting casing, being taken on the line 9—9 of Fig. 7; Fig. 10 is a transverse sectional view through the head of the pump, being taken on the line 10—10 of Fig. 7; Fig. 11 is a transverse sectional view through the cylinder of the pump and the air inlet casing, being taken on the line 11—11 of Fig. 7; Fig. 12 is a longitudinal sectional view taken through the controlling device or valve; Fig. 13 is a transverse section taken through the controlling device as on the line 13—13 of Fig. 12; Fig. 14 is a longitudinal section taken through a shut-off or balanced valve mounted between two of the branch pipes of the system and adapted to close either branch in case of breakage or undue leakage of air therefrom; and Fig. 15 is a section through one of the ball valves of the controlling device.

Referring to Fig. 1 of the drawings, the chassis comprises the usual frame 15, front wheels 16, rear twin wheels 17, and an internal combustion engine 14. An exhaust pipe 20 extends from the engine exhaust manifold to a muffler 19, and an exhaust pipe 21 extends from the muffler to the rear of the vehicle, these parts being shown more or less diagrammatically. The front wheels are mounted on steering knuckles 23, of any desired form, pivoted to the ends of a front axle 24. The rear wheels are mounted on the divided axle-shafts housed by a rear axle housing 25.

The air brake system, embodying my invention, comprises in general, an air pump 26 mounted on the engine 14 and connected by a pipe 27 to a pressure tank 28, a control valve 31 or device connected by a pipe 29 to the tank 28 and adapted to control the passage of compressed air through a pipe 32 which is connected to the central portion of a pipe 33, rear air brake cylinders 36, mounted as presently described and connected to the rear end of the pipe 33 through a pipe 35 and a flexible pipe or hose 34, and front air brake cylinders 38, mounted on the steering knuckles 23, as presently described and connected to the front end of the pipe 33, through a pie 37 the end portions of which are flexible to permit the wheels to be turned by the steering mechanism.

*The brakes per se.*

Referring to Figs. 2, 3, and 4, discs 39 are secured to or integral with the steering knuckles 23 and the ends of the rear axle housing 25 and each of these discs is provided with projecting arms 40 and 41. The outer end of the arm 41 carries a squared lug 42, as best shown in Fig. 4 and this lug projects into a radial slot 43 formed in the rib of a brake shoe or band 44 which carries a brake lining, as is usual in the art. A spring 45 is compressed between the lug 42 and a cup-shaped boss 46 on the brake band in order to normally hold the central portion of the brake lining out of contact with the inner periphery of the flange on the adjacent brake drum 47 on the wheel. A stud 49 on the brake band projects through a slot 50 in the arm 40, this construction being employed to prevent lateral displacement or vibration of the longer arm of the brake band. Secured to lugs on each disc 39 by means of bolts 51 is an air brake cylinder 52, which is positioned between the facing ends of the brake band, as best illustrated in Fig. 4. Springs 53, which are connected at their outer ends to holes in the brake band, and at their inner ends to hooks 54 on the brake cylinder, normally retain the free ends of the brake band out of contact with the flange of brake drum 47.

The heads or ends of each brake cylinder 52 are provided with central threaded openings in which are screwed adjustable flanged bosses or collars 56, the outer flanged ends of which are normally engaged by the facing edges of spaced vertical flanges 57 integral with the ends of the brake band. Mounted within the brake cylinder are two opposing pistons 58, the oppositely extending stems or rods 55 of which project through the sleeves 56. The outer extremities of the stems 55 are provided with resilient blocks 59 having outer convex surfaces engaging the ends of the brake band between the flanges 57. The right-hand piston is provided with a leftwardly extending tubular portion 60 slidable in the central bore in the left-hand piston in order to guide and properly align the pistons during their sliding movements. Each piston is provided with a flexible sealing washer 61 secured in position by a ring 62 and screws 63 (Figs. 4 and 5). The rings take up most of the space between the two washers 61 so that normally the air chamber between the two pistons is quite small which is desirable as the volume of air necessary to operate the brakes is correspondingly reduced and the condensation of moisture in the cylinders is also minimized. Air is conducted into the brake cylinder at a point between the opposing faces of the pistons through a nipple 64 under the control of the control device 31, as will be later described.

It will be obvious that when compressed air has been admitted between the opposing faces of the pistons, the pistons are moved apart with the result that the free ends of the brake band are expanded and the brake lining is forced against the flange of the brake drum 47 on the wheel, the braking effort being dependent upon the pressure of the air admitted to the brake cylinder under the control of the control valve.

It will be observed by referring to Figs. 2 and 3 that the blocks 42 are mounted off-center so that each brake band is divided into two arms, one of which is substantially longer than the other. The block for each rear brake is mounted rearwardly of the center of the brake band while the block for each front brake is positioned forwardly of the center of its brake band. This arrangement constitutes a very important feature of my invention, as it permits a greater braking effort to be applied to the rear wheels than to the front wheels, although the pressure of the air admitted to the brake cylinders of the front and rear brake mechanisms is the same, while at the same time the front and rear brake mechanisms are alike in construction. The braking effort on the rear wheels is greater than on the front wheels because the longer arms of the brake bands for the rear wheel are forwardly of their blocks 42 while the shorter arms of the front brake bands are forwardly of the blocks, and the direction of rotation of the wheels causes the longer arms of the rear brake bands to be forced more firmly against the flanges of the rear brake drums than are the shorter front arms of the front brake bands against the flanges of their brake drums. By this arrangement the rear wheels may be locked without locking the front wheels and I have preferably designed my system so that the maximum air pressure which can be applied against the pistons 58 is sufficient to lock the rear wheels but not the front wheels, and this is important because when the front wheels of a vehicle become locked control of the vehicle is lost in case of skidding, while so long as the front wheels are not locked the vehicle may be steered by the steering mechanism.

*Air pump.*

Referring now to Figs. 6 to 11, the air pump for supplying air to the brake system, is mounted on a housing or cover 65, bolted to the front of the internal combustion engine, the housing being adapted to house certain timing or driving gears or connections, as best illustrated in Figs. 7 and 9. The pump comprises a cylinder 66, mounted in an opening in a tubular extension 64 in the casing 65 and bolted thereto by bolts 65ª extending through openings in the head 67 and cylinder 66 of the pump and the extension 64. The head and cylinder are provided with communicating water jackets 68 which are supplied with water from the internal combustion engine cooling system through an inlet pipe 70, the water escaping back into the cooling system through an outlet pipe 71. The pump is water-cooled in order to prevent excessive heat being generated within the pump, which would result in condensation of any moisture in the air pumped by the pump, which is constantly operated and carbonization of the lubricating oil is also reduced to a minimum.

Mounted in the cylinder is a piston 72 reciprocated through a piston rod 73 and an eccentric 74 formed integral with a gear 75 (or chain sprocket if a chain drive rather than gears are employed) which is rigidly mounted on the forward end of the engine shaft by a screw 76 and a key 77 (Fig. 7). A projecting clutch member 78 is fastened to an extension 78ª of the gear by a pin 79, this clutch member being provided so that the engine may be started by a hand crank in the well-known manner.

The pump cylinder 66 is provided with a plurality of radiating openings 80 communicating with a flat shallow casing 81 as best shown in Figs. 7, 9 and 11. The casing 81 is clamped between the upper edge of the tubular extension 64 of the casing 65 and an annular shoulder 82 on the cylinder. Air is supplied to the casing 81 through a vertical pipe 83, shown in Figs. 6 and 9, to which may be applied an air cleaner of any approved construction for removing dust and all foreign matter from the air being supplied to the air pump. Mounted in the central bore in the head 67 of the pump is a hollow valve casing 84 having radiating openings 85 communicating with a conduit or passage 86 formed within the head, as best shown in Fig. 10. The front end of the pipe 27, which leads to the storage tank 28, is connected to the nipple screwed into the outer end of the conduit 86. The valve casing 84 houses a disc valve 87 (Fig. 7) which is normally spring-pressed to close the opening leading from the cylinder to the valve casing. It will be observed that a gasket 90, positioned between the head and cylinder, is quite thick so that when the piston is at the upper end of its stroke there is a clearance space above the piston in order that the air within the cylinder is not compressed to the extent which it would be were this clearance space not provided, the clearance space being such that the pump at each stroke can only compress the air in the cylinder to the desired maximum air pressure.

*Control device.*

The control device or valve is shown in detail in Figs. 12 and 13 to which reference will now be made. The control device includes a casing 91 having two vertical bores or chambers 92 and 93. The casing is provided with bosses, as shown in Fig. 13, and bolts 94 extend through the bosses and a part of the frame of the chassis to secure the control device in place. At the lower end of the bore 92 is an integral partition 95 having a central opening which forms a valve seat 96 and the opening is normally closed by a ball valve 97 held against its seat 96 by a spring 98 mounted in a hollow nut 99 closing a chamber 100 formed in the casing 91 under the partition 95. One end of the pipe 29 (Fig. 1), which extends from the pressure tank 28, is connected to an opening 101 (Fig. 12) in the chamber 100. Mounted in the bore 92 is a piston 103 having different diameters. The upper end is of largest diameter and is adapted to slide in the enlarged upper portion of the bore 93, while the adjacent reduced portion under this largest portion is adapted to slide in the upper end of the reduced portion of the bore 92. A downwardly extending tubular portion 104 of this piston has its external surface threaded and a nut 105, which is screwed thereon, holds a sealing washer 106 in position on the piston. The lower end of the tubular portion 104 has a pointed projection 108, the lower end of which rests on the ball valve 97. The tubular portion 104 is provided with ports 110 at its lower end. The forward end of the pipe 32, (Fig. 1) through which air passes from the control device to the pipe 33 is connected by a nipple (not shown) mounted in an opening 111 in the casing 91, this opening being between the ball valve 97 and the sealing ring 106. The upper enlarged end of the piston 103 is also hollow and is also provided with a valve seat 112 upon which is normally seated a ball valve 113. Resting on the ball valve 113 is a compression spring 114 which is normally not compressed and which supports at its upper end a foot plunger 115 adapted to be pressed by the foot of the operator to control the brake system. The lower end of the plunger 115 is provided with a flange 116 which is seated upon the upper coil of the spring 114. The spring 114 and plunger 115 are mounted in a tubular extension 117 which at its lower end is screw-threaded into the upper end of the bore 92 in the casing 91.

Mounted in the bore 93 of the casing 91 is a piston 119 having its lower portion 120 of larger diameter to slide in the enlarged lower portion of the bore 93. The piston 119 carries a sealing washer 121 held in place by a nut 122 threaded on an upwardly-extending tubular portion 123 of the piston. Extending through the central opening of the piston is the stem of a needle valve 124 having a flange 125 on its lower end. The valve stem is provided with a pin 126 and a spring 127 is compressed between the pin and the upper end of the tubular portion 123 and constantly tends to seat the upper pointed end of the valve against a seat 128 formed in a screw plug 129 mounted in the upper end of the casing 91 and in alignment with the bore 93. The screw plug 129 is provided with radiating openings 130 (Fig. 13) which at their outer ends communicate with an annular conduit or chamber 131 formed by reducing the lower end of the plug in diameter and the chamber communicates with one end of a transverse opening 132 which at its opposite end communicates with the bore 92, above the piston 103. The lower end of the piston 119 is provided with a screw plug 133 against which bears the upper end of a coil compression spring 134 positioned in a tubular extension 135 of the casing, the tubular extension being screwed at its upper end into the lower end of the bore 93. The lower end of the spring 135 is supported by the flange of a nut 136 screw-threaded on a screw 137 having an annular flange 138, seated on the lower end of the large bore of the extension 135 and provided on its lower end with a screw-on nut 136 which rigidly fastens the screw 137 in position. An inclined conduit 140 connects the chamber 100 with the chamber 141 formed between the plug 129 and piston 119. An air escape pipe (not shown), connected by a nipple (not shown) to an opening 142 in the casing 91, extends to the exhaust pipe for the internal combustion engine.

From the foregoing description, it will be clear that upon operation of the internal combustion engine the air pump 26 supplies compressed air to the pressure tank 28. When the pressure in this tank arrives at the predetermined maximum, say 100 pounds, for example, the needle valve 126 is opened by the air pressure to permit the escape of the excess air pumped by the pump, as the chamber 141 is in free communication with the pressure tank through the conduit 140, the chamber 100 and the pipe 29, and the spring 134 is so adjusted that the air in the chamber 141 when at maximum pressure, will force down the piston 119 against the action of the spring 134. When the internal combustion engine is not in operation, the upper end of the valve 124 is held against its seat 128 only by its spring 127, as its flange 125 is not in contact with the screw plug 133. Near the end of the downward movement of the piston 119 the flange 125 is engaged by a shoulder on the piston 119 with the result that the valve is unseated. The spring 127 is relatively light so that the valve 124 does not pound or press unduly against the seat, which would result in wear, and this wear would happen if the valve were rigidly connected with the piston 119 and was held against its seat by the spring 134. The screw 137 may be rotated in order to adjust the tension of the spring 134 so that the valve 124 will open at the desired pressure, it being clear that when the screw 137 is turned the screw collar 136 moves longitudinally thereon, being held from turning by the pressure exerted on it by the spring 134. After the pressure in the tank has reached the maximum point the valve 124 stays open more or less and the excess air pumped by the pump escapes past the valve and through the conduits 130 and 132, etc. into the exhaust pipe of the internal combustion engine.

When the brakes are to be applied, the operator presses on the foot plunger 115, whereupon the spring 114 becomes compressed and the ball valve 113, the piston 103 and the ball valve 97 are all lowered. As soon as the ball valve 97 is moved from its seat 96 compressed air passes from the chamber 100, past the valve seat 96 into the chamber 143 above the partition 95 and through the pipes 32, 33, etc. to the brake cylinders 36 and 38, whereupon the brakes are applied. As soon as the pressure in the chamber 143, due to the building up of the pressure in the brake cylinders and conduits, is equal to the pressure exerted on the foot plunger 115, the piston 103 is moved or forced upwardly to normal position against the action of the spring 114, whereupon the valve 97 closes. If more braking effort is to be exerted by the brakes, the operator then presses the plunger 115 down further to again force the valve 97 from its seat and then as soon as the pressure in the chamber 100 builds up to a pressure equal to that exerted on the plunger 115 the valve 97 again seats. While air is passing to the chamber 143, the needle valve 124 is closed more or less as the pressure in the chamber 141 drops. Now, after the brakes have been applied and when they are to be fully or partially released, the operator permits the plunger 115 to rise to an extent dependent upon the extent to which the brakes should be released, whereupon the pressure on the ball valve 113 is reduced and the piston 103, with the ball valve 113, are raised by the air pressure in the chamber 143 until the upper end of the piston engages the shoulder 112ª on the lower end of the casing extension 117 whereupon the ball valve is raised off its valve seat 112, the air then escaping past the ball valve 113 through the opening 142 and into the exhaust pipe. During this time the ball valve 97 is seated. If the brakes are only to be partially released, then the ball valve 113 is re-seated as soon as the pressure in the chamber 143 equals that exerted on the ball 113 through the foot plunger 115 and the spring 114. If the brakes are to be entirely released the foot is removed from the plunger 115 and all of the air, compressed above atmospheric pressure, in the brake cylinders, the conduits, and the chamber 143 escapes past the ball valve 113, which is unseated, through the opening 142 into the exhaust pipe.

I preferably form the ball valves 97 and 113 of hard rubber in which is imbedded wire gauze 144 as illustrated in Fig. 15. The wire gauze aids the rubber in resisting distortion of the valves when seated. I find that hard rubber is preferable to metal as the latter corrodes and wears away the valve seats whereas the former does not. It will also be noted that the valve seats 96 and 112 and the ball valves 97 and 113 are large, which permits a more sensitive operation of the system as the air flows more freely, the wear on the valves and seats is reduced and such fine adjustments are not required as in air brake systems in which the control valves and their seats are small.

Referring now to Fig. 1, it will be seen that the pressure tank 28 is positioned adjacent to and heated by the exhaust pipe 20, the control valve 31 is near the rear end of the internal combustion engine 17 and is heated thereby, and pipe 32 and the rear half of pipe 33 are in close proximity with and heated by the exhaust pipes 20 and 21. This arrangement is of advantage as there is no sudden change in temperature of the air (which is heated during compression in the air pump 26) as it passes through the pipe 27, tank 28, pipe 29, control device 31, pipe 32 and the rear part of pipe 33, and hence condensation of moisture and other objectionable results due to sudden temperature changes in the air, are avoided.

*Balance shut-off valves.*

In the pipe unions 147 (Figs. 1 and 14) by which the rear end of the pipe 32 is connected to the pipe 33, the rear end of the flexible hose 34 is connected to the branch pipes 35 and the forward end of the pipe 33 is connected to the branch pipes 37. I provide balance valves as shown in Fig. 14, which serve the purpose of closing either branch pipe 33, either branch pipe 35, or either branch pipe 37, as the case may be, in the event of excessive leakage from the pipe (as in case of breakage) or one of the brake cylinders, so that the operation of the remainder of the system will not be effected or impaired. Each of these valves comprises a ball valve 148 mounted at the center of the union 147 and normally held in its central non-closing position by balanced springs 149 located between the ball and shoulders 150 on nipples 151 connecting the branch pipes 33, 35 or 37 to the union 147. As shown in Fig. 14, the ball is normally between the two diverging openings 152 through which compressed air passes from the pipes 32, 34 or 33, as the case may be, to either side of the ball valve 148. In case of a drop of pressure on one side of the ball valve, due to excessive leakage from one of the brake cylinders or from one of the branch pipes, the valve is moved by the greater air pressure in the other branch pipe toward nipple connected to the leaking pipe or the pipe connected to the leaking brake cylinder and seats the ball against a seat 153 on the inner end of the nipple, thus closing off the leaking section of the system but permitting the effective operation of the remainder of the system.

*Preventing condensation of moisture.*

It will be observed that the rear end of the flexible hose 34 is connected to the middle of the branch pipe 35 which is rigidly secured to rear axle housing 25 while the formed end of the hose 34 is connected to the rear end of the pipe 33 rigidly secured to one of the side sills of the chassis frame. In prior air brake systems for road vehicles two flexible pipes, one on each side of the chassis frame, have been used to supply air to the rear brake cylinders. Flexible pipes or hose are apt to crack or break and therefore I reduce this liability by using one flexible hose instead of two. The branch pipes 35 and the pipe 33 may be of copper.

While I have herein described in some detail the particular embodiment of my invention, for the purposes of full disclosure, it will be understood by those skilled in the art that many changes in detail might be made without departure from the spirit or scope of my invention hereinafter claimed.

I claim:

1. In an air brake system for road vehicles, an excess air escape device comprising a valve and a fixed seat therefor, a spring tending to seat said valve, a movable piston associated with said valve, and a spring acting on said piston in one direction, the piston being moved against the action of said last mentioned spring by air pressure to unseat said valve.

2. In an air brake system for road vehicles, an excess air escape device comprising a valve and a fixed seat, a spring tending to seat said valve, a movable piston having a lost motion connection with the stem of said valve and adapted to be moved by air pressure to unseat the valve, and a stronger spring tending to resist such movement of said piston.

3. In an air brake system for road vehicles, an excess air escape device comprising a valve and a fixed seat, a weak spring tending to seat said valve, a movable piston having a lost motion connection with the stem of said valve and adapted to be moved by air pressure to unseat the valve, a stronger spring tending to resist such movement of said piston and means for adjusting said stronger spring.

4. In an air brake system for road vehicles, an excess air escape device comprising a needle valve and a fixed seat therefor, a weak spring serving as the sole means for seating said valve, a movable piston having an opening through which the stem of said valve extends, a projection on said valve normally spaced from a shoulder on said piston and a stronger spring cooperating with said piston, the piston being moved by air pressure against the action of said stronger spring to unseat said valve when said shoulder engages said projection.

5. In an air brake system for road vehicles, a control device for controlling the pressure therein and comprising a casing having an inlet chamber, an outlet chamber for connection with to cylinders of said system, an exhaust opening, and an excess air escape valve chamber, an inlet valve for controlling the passage of compressed air to said outlet chamber, an exhaust valve controlling escape of air from said outlet chamber to said exhaust opening, means for controlling operation of said valves, an escape valve in said escape valve chamber, a conduit from said escape valve chamber leading to said exhaust opening, a spring for causing said escape valve to close said last mentioned conduit and means operated by air pressure for opening said escape valve.

6. In an air brake system for road vehicles, a combined control device and excess air escape device, said control device embodying a manually operable member to control the fluid pressure in said system and including an inlet valve, an exhaust opening, the excess air escape device embodying a chamber, a valve for exhausting air from said chamber and a fixed seat for said valve, the combined device having a passage from the high pressure side of the inlet valve of the control device to the chamber of the escape device, and a passage from the outlet of said valve of the air escape device to the exhaust opening of the control device.

7. The invention defined in claim 6 together with a movable piston slidably associated with the valve stem of the valve of the excess air escape device to at times move said valve and open the chamber to the said exhaust passage and a spring acting to resist said movement of the piston and yielding at times against the greater pressure of the air in said chamber.

ERIK OLIE SCHJOLIN.